United States Patent [19]

Sakai et al.

[11] Patent Number: 6,091,476
[45] Date of Patent: Jul. 18, 2000

[54] LIQUID CRYSTAL DISPLAY USING SPACERS HAVING HYDROPHOBIC INORGANIC PARTICLES ATTACHED TO THE SPACER BODY

[75] Inventors: Yasuhiro Sakai, Suita; Shinji Takasaki, Settu; Yoshikuni Sasaki, Suita; Shigefumi Kuramoto, Takatsuki, all of Japan

[73] Assignee: Nippon Shokubai Co., Ltd., Osaka, Japan

[21] Appl. No.: 08/894,166

[22] PCT Filed: Jun. 24, 1997

[86] PCT No.: PCT/JP97/02183

§ 371 Date: Aug. 12, 1997

§ 102(e) Date: Aug. 12, 1997

[87] PCT Pub. No.: WO97/50015

PCT Pub. Date: Dec. 31, 1997

[51] Int. Cl.[7] .............................. G02F 1/1339; B32B 5/16
[52] U.S. Cl. ........................ 349/155; 428/1.52; 428/405; 428/406
[58] Field of Search .............................. 349/155; 428/405, 428/406, 1.52

[56] References Cited

U.S. PATENT DOCUMENTS

| 5,503,932 | 4/1996 | Sakai et al. | 428/404 |
| 5,843,525 | 2/1999 | Freeman et al. | 428/405 |
| 5,900,315 | 5/1999 | Little | 428/405 |

FOREIGN PATENT DOCUMENTS

| 1-241524 | 9/1989 | Japan . |
| 4-301620 | 10/1992 | Japan . |
| 7-333623 | 12/1995 | Japan . |
| 8-136933 | 5/1996 | Japan . |
| 8-146435 | 6/1996 | Japan . |
| 8-152738 | 6/1996 | Japan . |

*Primary Examiner*—Kenneth Parker

[57] ABSTRACT

The present invention provides: a spacer for a liquid crystal display, which is difficult to aggregate when dispersed onto a substrate in a dry manner; a production process for the spacer; and a liquid crystal display including the spacer. The spacer has a mean particle diameter of 0.5 to 25 μm, a coefficient of variation of 10% or less in particle diameter, and a fluidity of 30% or more, and preferably further has an electrification retention ratio of 40% or more at 5 minutes after corona electrification.

40 Claims, 3 Drawing Sheets

Fig.-2
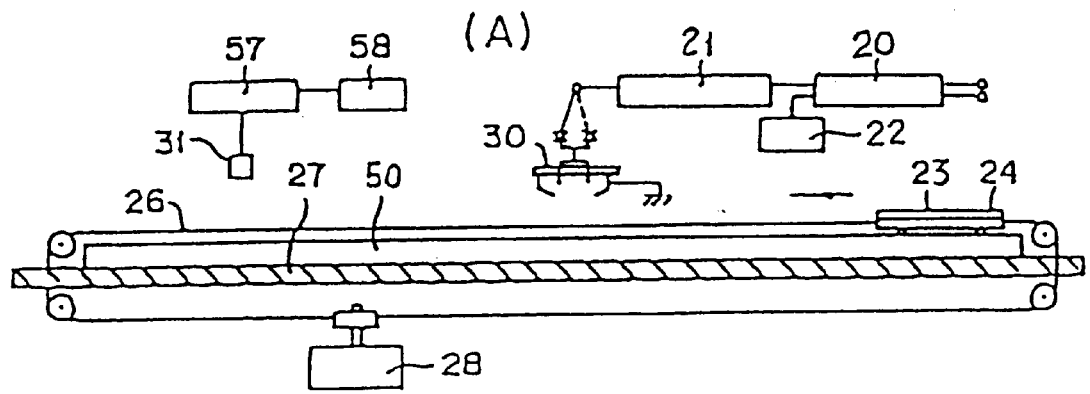
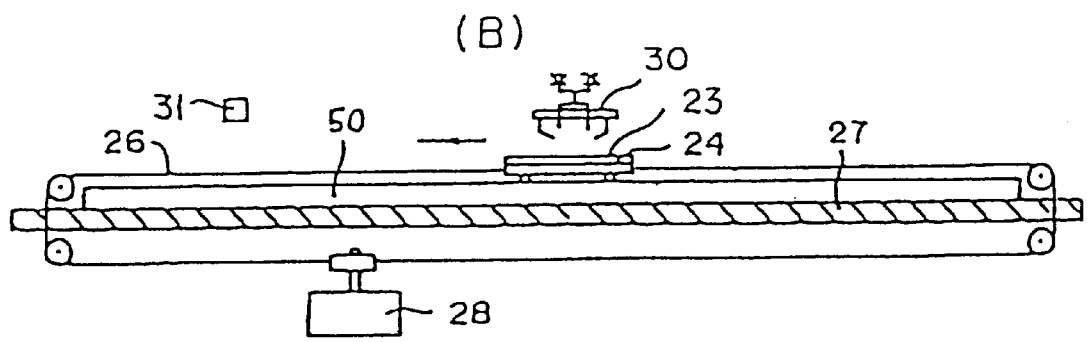
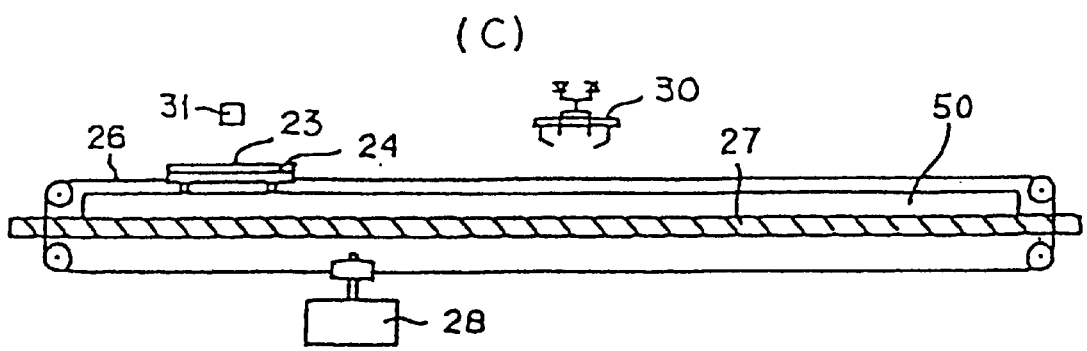

LIQUID CRYSTAL DISPLAY USING SPACERS HAVING HYDROPHOBIC INORGANIC PARTICLES ATTACHED TO THE SPACER BODY

TECHNICAL FIELD

The present invention relates to: a spacer for a liquid crystal display, which has excellent dry dispersibility; a production process for the spacer; and a liquid crystal display with the spacer.

BACKGROUND ART

A liquid crystal display (LCD) generally comprises two opposed electrode substrates, a spacer, as interposed therebetween, and a liquid crystal substance. The spacer serves to get the thickness of a liquid crystal layer uniform over the planar entirety of the layer by keeping the interval between the two electrode substrates constant over the planar entirety of the electrode substrates.

Generally, high speed of response, high contrast, a wide viewing angle, etc. are among display performance characteristics cited as such as demanded in practical use of the liquid crystal display. For these performance characteristics to be realized, the thickness of the liquid crystal layer, namely, the gap distance between the two electrode substrates, must be kept strictly constant.

A process for producing a liquid crystal display is, for example, carried out in the following way: a particle for the liquid crystal display is first dispersed onto one of the substrates uniformly so that the particle may not aggregate; and the dispersed particle is then covered with the other substrate.

Conventionally, the dispersion of the particle is carried out in a wet manner. The wet manner is, for example, a manner in which a substrate is sprayed with a dispersion which is prepared by dispersing a spacer particle into a solvent such as flon, alcohol, or a water-alcohol-mixed solvent. The wet manner, however, has problems, for example, in the following respects: regulation against flon; environmental contamination and flaming due to organic solvents; and damage or contamination to an oriented membrane due to solvents.

Therefore, recently, the dispersion in the wet manner is being replaced with that in a dry manner. The dry manner is a manner in which a spacer particle is directly dispersed onto a substrate with a compressed gas such as nitrogen. For example, a dry manner is proposed which utilizes a high speed gas stream manner or an electrostatic dispersion manner. The high speed gas stream manner is a manner in which: a predetermined amount of spacer particle is electrified by friction through pipes, and the spacer particle is then vomited from a nozzle to a substrate. In addition, the electrostatic dispersion manner is a manner in which a spacer particle is vomited from a high-voltage-applied nozzle to an earthed substrate.

The dry dispersion manner is excellent in that no solvent is used, and this manner is often applied to a TFT-LCD. However, this manner has another problem in that the particle aggregates when dispersed, because no solvent is used. Where the dispersed particle aggregates, it is difficult to keep the gap distance between electrode substrates constant, and "leakage of the light of a backlight lamp" therefore occurs in that the area where no image is partially formed increases. As a result, the image display quality becomes low.

By the way, the above-mentioned leakage of the light of a backlight lamp is also caused by that the orientation of a liquid crystal on the periphery of the spacer is disordered due to interactions between liquid crystal molecules and a surface of the spacer particle, and by that somewhat of a space which transmits the light is therefore formed on the periphery of the spacer. Recently, the display area is getting larger and larger (e.g., 12 inches or more) in the uses for televisions, monitors, notebook type personal computers, word processors, etc. In addition, the display area is also getting larger and larger in the uses for car navigation systems, televisions, etc., as equipments for cars. Accompanying such enlargement of the display area, vibration or impact as given to the liquid crystal display becomes larger, so the leakage of the light of a backlight lamp from the periphery of the spacer further increases in area. As a result, the image display quality of the liquid crystal display is liable to deteriorate. Thus, it is important that the leakage of the light of a backlight lamp from the periphery of the spacer does not increase even if vibration or impact is given to the liquid crystal display.

In a conventional method for preventing such leakage of the light of a backlight lamp from the periphery of the spacer, a surface of the spacer particle is treated with vertical-orientation treatment agents such as alkyltrialkoxysilanes. It was, however, found that: where such a treatment is made, the spacer particles might easily aggregate together and show bad dry dispersibility, and as a result, the leakage of the light of a backlight lamp due to the aggregation of the particle increases, and the image display quality therefore deteriorates.

DISCLOSURE OF THE INVENTION

Objects of the Invention

It is a first object of the present invention to provide a spacer for a liquid crystal display, which has excellent dispersibility and is difficult to aggregate when dispersed onto an electrode substrate in the dry manner.

It is a second object of the present invention to provide a spacer for a liquid crystal display, which does not cause either the leakage of the light of a backlight lamp due to the disorder of the orientation of a liquid crystal or due to the aggregation of the particle of the spacer.

It is another object of the present invention to provide a process by which the spacer of the above-mentioned first or second object can be produced.

It is also another object of the present invention to provide a liquid crystal display which has better image display quality than that of conventional ones.

SUMMARY OF THE INVENTION

Examples of the particle for the spacer are as follows: a silica particle which is made by a sol-gel method Japanese Patent Application Publication (Kokai) No. 62-269933); a sinter of the aforementioned silica particle (Japanese Patent Application Publication (Kokai) No. 1-234826); and a styrene- or divinylbenzene-based polymer particle which is obtained by suspension polymerization of a styrene- or divinylbenzene-based monomer Japanese Patent Application Publication (Kokai) No. 61-95016).

The present inventors considered improving a particle itself for a spacer in order to solve the above-mentioned problems of the aggregation. In the process of this consideration, the inventors found that an index for distinguishing particles that were difficult to aggregate was necessary. In other words, they found that if there was an index by which the dry dispersibility of an improved particle could easily be evaluated, such an index was convenient, because it took so much time and labor to actually disperse the improved particle in a dry manner and then observe the occurrence of the aggregation every time when the dry dispersibility of the improved particle was evaluated. Then, the inventors got various ideas and examined them by experiment. As a result, it was proved that the below-mentioned parameter could be the above-mentioned index. Thus, the inventors decided to propose a spacer having such an index, because a particle having such an index surely showed excellent dry dispersibility.

Thus, a spacer for a liquid crystal display, according to the present invention, to attain the aforementioned first object, comprises a particle which has a mean particle diameter of 0.5 to 25 μm, a coefficient of variation of 10% or less in particle diameter, and a parameter "fluidity," as measured by the below-mentioned measurement method, of 30% or more.

The method for the measurement and the definition of the fluidity comprises the following steps of:

piling three different types of JIS-Z8801-standard sieves (made by Iida Seisakusho Co., Ltd.) on, wherein the three sieves comprise a brass frame and bronze meshes and have an inner diameter of 75 mm, a depth of 20 mm, and a mesh size of 150 μm (100 meshes), 75 μm (200 meshes), and 45 μm (330 meshes), respectively, and wherein the piling-on of the three sieves is carried out in order of 150 μm (100 meshes), 75 μm (200 meshes), and 45 μm (330 meshes) in mesh size from the top;

putting 2.0 g of powder, to examine, on the entire meshes of the top sieve so uniformly that a surface of the powder may get as even as possible;

vibrating the three piled-on sieves up and down at an amplitude of 1 mm and a frequency of 60 Hz for 120 seconds with Powder Tester PT-E made by Hosokawa Mikron Co., Ltd.; and defining the ratio by weight (%) of a portion, which passes through the bottom sieve, of the powder to the initial weight of the powder (2.0 g), namely, the meshes-passing ratio, as the fluidity.

On the other hand, it was also found that if the spacer further has an electrification retention ratio of 40% or more at 5 minutes after corona electrification, the aforementioned leakage of the light of a backlight lamp from a periphery of the spacer due to the disorder of the orientation of a liquid crystal can easily be prevented. The electrification retention ratio is, herein, a numerical value as determined in the below-mentioned way.

Thus, it is preferable for attaining the aforementioned second object that the spacer of the present invention further has an electrification retention ratio of 40% or more at 5 minutes after corona electrification.

Electrification Retention Ratio:

This is measured in the below-mentioned way using a corona electrification property measurement apparatus 20 as shown in FIGS. 1 and 2.

In this apparatus, a conveyance support 24 is mounted on two rails 49 and 50 as laid in parallel on a bed 27. The conveyance support 24 is moved back and forth along the rails 49 and 50 on the bed 27 by tractional force of a wire 26 which moves rotationally in forward and reverse directions. The forward and reverse rotational movements of the wire 26 are made by rotational driving of a motor 28. The time as needed for the movement of the conveyance support 24 from the front end position (original point) to the rear end position (surface potential measurement point) is within 1 second. Position detectors 51, 52, and 53 are set at three front, middle, and rear places by the side of the running course of the conveyance support 24 so as to detect positions of the conveyance support 24. A corona discharge electrode 30 is set above a middle portion of the running course, and a surface potential detector 31 is set above the rear end of the running course. In the drawing figures, the symbolic numbers 20, 21, 22, 57, and 58 represent a slidac, a transformer, a voltmeter, an electric-potential detection circuit, and a recorder, respectively.

A powder to examine 23 is placed into a metal-made cell (undrawn), and the cell containing the powder is mounted on the conveyance support 24 at the position of the detector 51 (FIG. 2 (A)). The powder is subjected to corona discharge at the position of the detector 52 and thereby electrified in a moment (FIG. 2 (B)), and the surface potential of the powder is detected by the detector 31 at the position of the position detector 51 (FIG. 2 (C)). The surface potential of the powder 23 is measured in time series since immediately after the electrification. In addition, usually, a surface potential in an unelectrified state is first measured for zero-adjustment of the measurement of the electric potential. The potential detection circuit 57 detects an outputted signal from the detector 31, and results thereof are recorded by the recorder 58 in time series.

In an example of actual measurement, the powder 23 is placed into a cylindrical hole of 5 cm in diameter and 0.3 cm in depth as opened in a metal-made cell of 7.6 cm in diameter and 0.5 cm in height, and the cell containing the powder is allowed to stand stationary under atmosphere of 20° C., 60% RH for 16 hours and then mounted on the conveyance support 24. Conditions for this measurement are as follows: the voltage as applied to the corona discharge electrode 30 is 3.6 kV, and the distance between the corona discharge electrode 30 and the surface of the powder 23 is 2 cm. The measurement is carried out under atmosphere of 20° C., 60% RH.

The electrification retention ratio (Ec) as of 5 minutes after corona electrification is calculated from the below-mentioned equation using the following parameters: a surface potential (A) as of after standing stationary for 16 hours, a measured surface potential ($B_1$) as of immediately after corona electrification, and a measured surface potential ($B_2$) as of 5 minutes after corona electrification.

$$E_c = \frac{Q_3 - Q_1}{Q_2 - Q_1} \times 100(\%) = \frac{CB_2 - CA}{CB_1 - CA} \times 100(\%)$$
$$= \frac{B_2 - A}{B_1 - A} \times 100(\%)$$

wherein:

$E_c$ is an electrification retention ratio (%) as of 5 minutes after corona electrification;

$Q_1$ is an electrification quantity as of after standing stationary for 16 hours;

$Q_2$ is an electrification quantity as of immediately after corona electrification;

$Q_3$ is an electrification quantity as of 5 minutes after corona electrification;

C is the capacitance of the powder 23.

A first process for producing a spacer, according to the present invention, to enable a spacer particle to display the fluidity as defined above, comprises the step of attaching a fine particle to a surface of a particle body.

As is shown in a typical model view, FIG. 3, a spacer 1 resultant from such a process has a structure in which fine particles 1b are attached to a surface of a particle body 1a. However, it should be noted that FIG. 3 only shows a model view, and that the ratio in size between the particle body 1a and the fine particles 1b as well as the number of the fine particles 1b as attached to the surface of the particle body 1a might be different from those of an actual product of the spacer 1.

A second process for producing a spacer, according to the present invention, to enable a spacer particle to jointly display the fluidity and the electrification retention ratio as defined above, comprises the step of treating a surface of a raw particle with at least one silicon compound selected from the group consisting of:

silane compounds (1) of the following general formula (1):

$$R^1R^2SiX_2 \qquad (1)$$

wherein:
- $R^1$ is at least one monovalent group selected from the group consisting of: fluoroalkyl groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;
- $R^2$ is at least one monovalent group selected from the group consisting of: allyl groups with 1 to 5 carbon atoms; alkenyl groups with 1 to 5 carbon atoms; and aryl groups with 6 to 20 carbon atoms; and
- X is a monovalent hydrolyzable group wherein the two X groups may be identical with or different from each other;

silane compounds (2) of the following general formula (2):

$$R^3R^4R^5SiX \qquad (2)$$

wherein:
- each of $R^3$ to $R^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and
- X is a monovalent hydrolyzable group which may be identical with or different from those in general formula (1) above; and silazanes.

A liquid crystal display, according to the present invention, comprises:
two electrode substrates, which are arranged opposite to each other;
a spacer, which is interposed between the electrode substrates, thereby maintaining a gap distance between the electrode substrates; and
a liquid crystal, which is packed between the electrode substrates;
wherein the spacer comprises a particle which has a mean particle diameter of 0.5 to 25 μm, a coefficient of variation of 10% or less in particle diameter, and a parameter "fluidity," as measured in the above-mentioned measurement way, of 30% or more. As to this liquid crystal display, the spacer preferably further has an electrification retention ratio of 40% or more at 5 minutes after corona electrification, thus preventing the light of a backlight lamp from leaking from a periphery of the spacer when vibration or impact is given to the liquid crystal display.

DETAILED DESCRIPTION OF THE INVENTION

First, the spacer, according to the present invention, is illustrated below.

The fluidity of the particle constituting the spacer is in a range of 30% or more, preferably, 40% or more, more preferably, 50% or more, most preferably, 60% or more. Where the fluidity is less than 30%, the particle is prone to aggregate, so there is a high possibility that the aggregate might be dispersed intactly onto an electrode substrate. As a result, the gap distance between liquid crystal display substrates is difficult to keep uniform and constant, and the leakage of the light of a backlight lamp also increases.

The mean particle diameter of the spacer particle is in a range of 0.5 to 25 μm, preferably, 1 to 18 μm. A particle having a mean particle diameter deviating from the range of 0.5 to 25 μm cannot be used as the spacer.

The coefficient of variation in particle diameter of the spacer particle is in a range of 10% or less, preferably, 6% or less. Where the coefficient of variation in particle diameter is more than 10%, it is difficult to keep the thickness of a liquid crystal layer uniform and constant, so the image unevenness is easily caused.

The definition or measurement method of the mean particle diameter or of the coefficient of variation in particle diameter is, herein, as follows:

Mean Particle Diameter and Coefficient of Variation in Particle Diameter:

The mean particle diameter, the standard deviation of the particle diameter, and the coefficient of variation in particle diameter are determined by: observing a particle with an electron microscope; measuring respective particle diameters of 200 particles as chosen at random from the resultant electron micrograph; and calculating the objective numerical values in accordance with the following equations:

$$\text{Mean particle diameter } (\overline{X}) = \frac{\sum_{i=1}^{n} X_i}{n}$$

$$\text{Standard deviation of particle diameter } (\sigma) = \left( \frac{\sum_{i=1}^{n} (\overline{X} - X_i)^2}{n-1} \right)^{1/2}$$

$$\text{Coefficient of variation in particle diameter } (\%) = (\sigma / \overline{X}) \times 100$$

The electrification retention ratio of the present invention spacer is preferably not less than 40%, more preferably, not less than 50%, still more preferably, not less than 60%, most preferably, not less than 70%, at 5 minutes after corona electrification.

Although there is no especial limitation in the means for improving the fluidity of the spacer particle of the present invention, the fluidity is improved, for example, as mentioned below, by attaching a fine particle to a surface of the particle body, or by treating a surface of the raw particle. As to a substantial portion of this improved spacer particle, namely, as to a portion corresponding to the particle body or raw particle, various types can be used and thus there is no especial limitation. However, examples thereof are particles such as organic crosslinked polymer particles and organic-inorganic-composite particles. Among these particles, the organic-inorganic-composite particles are preferable, because they have moderate hardness and mechanical resilience and thus easily provide a uniform gap between electrode substrates even if the number of the dispersed particles is small, so that the leakage of the light of a backlight lamp, derived from the spacer, can be lessen.

The organic crosslinked polymer particle is not especially limited, but examples thereof are as follows: a cured particle of at least one amino compound selected from the group consisting of benzoguanamine, melamine, and urea, or a cured particle of an amino resin as obtained from a condensation reaction between benzoguanamine and formaldehyde Japanese Patent Application Publication (Kokai) No. 62-068811); a divinylbenzene-crosslinked resin particle as obtained by homopolymerizing divinylbenzene or copolymerizing it with another vinyl monomer Japanese Patent Application Publication (Kokai) No. 1-144429).

The above-mentioned organic-inorganic-composite particle is a composite comprising an organic and an inorganic moiety. In this composite, the ratio of the inorganic moiety is not especially limited, but it is, for example, preferably in a range of 10 to 90 wt %, more preferably, 25 to 85 wt %, still more preferably, 30 to 80 wt %, in terms of inorganic oxide, relative to the composite. The ratio of the inorganic moiety in terms of inorganic oxide is shown by the percentage of the weight of the composite particle as of after sintered at high temperature (e.g. 1,000° C.) under oxidative atmosphere such as air relative to the weight of the composite particle as of before such sintering. Where the ratio of the inorganic moiety is less than 10 wt % in terms of inorganic oxide, the composite particle might be too soft, so the number of spacers to disperse onto electrode substrates must be increased greatly. On the other hand, where the ratio is more than 90 wt %, the composite particle might be too hard, so the damage of an oriented membrane or the breakage of TFT array might easily be caused.

Specific examples of the organic-inorganic-composite particle include composite particles comprising an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt %, preferably, 25 to 85 wt %, more preferably, 30 to 80 wt %, relative to the composite particles (e.g., Japanese Patent Application Publication (Kokai) No. 8-81561 and U.S. Pat. No. 5,503,932). However, the organic-inorganic-composite particle is not limited to these particles.

The process for producing the composite particle is not especially limited, but a preferable example thereof is a production process comprising the below-mentioned steps of condensation, polymerization, and thermal treatment, because such process can easily provide the composite particle.

The condensation step includes the step of carrying out hydrolysis-condensation of a silicon compound containing a radical-polymerizable group.

The silicon compound containing a radical-polymerizable group is at least one compound selected from the group consisting of compounds of the below-mentioned general formulae (3) to (5) and derivatives therefrom.

General formula (3):

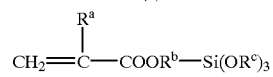

(3)

wherein:

$R^a$ is a hydrogen atom or methyl;

$R^b$ is a divalent organic group with 1 to 20 carbon atoms, which may have a substituent; and $R^c$ is at least one monovalent group selected from the group consisting of a hydrogen atom, alkyl groups with 1 to 5 carbon atoms, and acyl groups with 2 to 5 carbon atoms.

General formula (4):

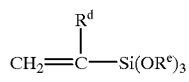

(4)

wherein:

$R^d$ is a hydrogen atom or methyl; and $R^e$ is at least one monovalent group selected from the group consisting of a hydrogen atom, alkyl groups with 1 to 5 carbon atoms, and acyl groups with 2 to 5 carbon atoms.

General formula (5):

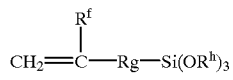

(5)

wherein:

$R^f$ is a hydrogen atom or methyl;

$R^g$ is a divalent organic group with 1 to 20 carbon atoms, which may have a substituent; and $R^h$ is at least one monovalent group selected from the group consisting of a hydrogen atom, alkyl groups with 1 to 5 carbon atoms, and acyl groups with 2 to 5 carbon atoms.

The polymerization step includes the step of carrying out a radical polymerization reaction of the radical-polymerizable group either during or after the condensation step, or both during and after the condensation step. The thermal treatment step includes the step of drying and sintering a polymer particle, resultant from the polymerization step, at a temperature of 800° C. or lower, preferably, 150 to 600° C.

The thermal treatment step is, for example, carried out under an atmosphere having an oxygen concentration of 10% by volume or less.

The production process may further comprise the coloring step in which the resultant particle is colored either during or after, or both during and after at least one step selected from the group consisting of the condensation step, the polymerization step, and the thermal treatment step.

The shape of the spacer is not especially limited, but a sphere is favorable for obtaining a uniform and constant gap distance between electrode substrates, because if a particle is spherical, this particle has a constant or nearly constant particle diameter in all or nearly all directions.

If need arises, the spacer may be colored, for example, by allowing the spacer to contain dyes or pigments. The color is preferably a color which is difficult to transmit the light or does not transmit the light, because such a color can prevent the light of a backlight lamp from leaking and can improve contrast in image quality. Examples of the color, which is difficult to transmit the light or does not transmit the light, include colors such as black, dark blue, navy blue, purple, blue, dark green, green, brown and red. Particularly, black, dark blue and navy blue are preferred. Either or both of the dye and the pigment may be contained simply in the spacer, but it is preferable that either or both of the dye and the pigment are chemically bonded to the spacer, because if the spacer has such a structure, the dye or pigment leaks from the spacer little.

Next, the first production process of the present invention is mentioned.

The fine particle for improving the fluidity is attached to part or the entirety of a surface of the particle body. The particle body, as referred to herein, is a matter corresponding to a substantial portion of the spacer. The particle body, for example, comprises the organic crosslinked polymer particle or the organic-inorganic-composite particle, and preferably comprises the organic-inorganic-composite particle for the same reason as aforementioned. The state where the fine particle is attached to the particle body may be either of the following examples of states, if attention is paid to a specific one of such fine particles: (1) a state where the fine particle is not embedded in, but is simply attached to a surface of the particle body and where almost the entirety of the fine particle is therefore exposed from the surface; (2) a state where part of the fine particle is embedded in the particle body and where only the rest of the fine particle is exposed from a surface of the particle body. If the state of the fine particle is state (1), a spacer of such a state has more excellent dry dispersibility. The state of the fine particle in the entire amount of the spacer may be either state (1) or (2) above, or a mixture of states (1) and (2) above.

The mean particle diameter of the fine particle is not especially limited, but is preferably in a range of 1.0 $\mu$m or less, more preferably, 0.5 $\mu$m or less, still more preferably, 0.1 $\mu$m or less, most preferably, 0.03 $\mu$m or less. Where the mean particle diameter is more than 1.0 $\mu$m, the precision of the gap distance of a liquid crystal display is so greatly affected that the reduction in image quality might be caused. The proportion of the mean particle diameter of the fine particle to the mean particle diameter of the particle body is not especially limited, but the proportion is preferably 0.05 or less, further preferably, 0.01 or less. The measurement of the mean particle diameter of the fine particle is carried out in the aforementioned way to measure the mean particle diameter of the particle body.

The attachment ratio of the fine particle (the fine particle content) to the particle body is not especially limited, but the attachment ratio is, for example, preferably in a range of 0.001 to 10% by weight, more preferably, 0.05 to 5% by weight, still more preferably, 0.1 to 1% by weight, of the particle body. Where the attachment ratio is out of the range of 0.001 to 10% by weight, the dry dispersibility is liable to reduce.

The fine particle is not especially limited, but, for example, at least one type selected from the group of consisting of inorganic fine particles and organic crosslinked fine particles is used. Among these particles, the inorganic fine particles are preferably used, because they further improve the dry dispersibility.

The inorganic fine particle is not especially limited, but, for example, at least one type selected from the group of consisting of metal oxides, such as $SiO_2$, $Al_2O_3$, $TiO_2$, and $Fe_2O_3$, and hydroxides of Si, Al, Ti, and Fe is preferable for further improving the dry dispersibility. Among these examples, $SiO_2$ of which the surface is got hydrophobic with hydrophobic groups such as methyl is preferable, because such $SiO_2$ has large insulation property and therefore do not cause short circuit. Examples of commercially available inorganic fine particles are Aerosil 50/130/200/200V/ 200CF/200FAD/300/300CF/380/TT600/OX50/R972/ R972V/R972CF/R974/MOX80/MOX170/COK84/R812/ RX200/R202/RY200/R805, Aluminum Oxide C, Titanium Dioxide T805, Titanium Dioxide P25, which are all trade names and available from Nippon Aerosil Co., Ltd.

The organic crosslinked fine particle is not especially limited, but an example thereof is a particle as obtained by crosslinking polymethyl methacrylate or polystyrene.

The present invention spacer, for example, may have a structure comprising: an adhesive particle as the particle body, which has the adhesion or tackiness on the surface; and a fine particle, which is attached to a surface of the adhesive particle. The adhesive particle has a structure in which at least part, namely, part or the entirety, of a surface of the particle body is covered with an adhesive layer or pressure sensitive adhesive layer. The adhesive layer or pressure sensitive adhesive layer may be chemically bonded to a surface of the particle body. The adhesive layer or pressure sensitive adhesive layer is not especially limited, but such as contains a thermoplastic resin is preferable. The thickness of the adhesive layer or pressure sensitive adhesive layer is not especially limited, but is usually in a range of 0.01 to 2 $\mu$m, preferably, 0.05 to 1 $\mu$m. The thermoplastic resin, which may be contained in the adhesive layer or pressure sensitive adhesive layer, is not especially limited if the thermoplastic resin acts as an adhesive or pressure sensitive adhesive, for example, to electrode substrates. However, the most preferable one for further improving the adhesion or tackiness is at least one type selected from the group consisting of (meth)acrylic resins and (meth)acryl-styrene resins. The glass transition temperature of the thermoplastic resin is preferably in a range of 40 to 100° C., more preferably, 50 to 90° C. In addition, the melting-initiation temperature of the thermoplastic resin is preferably in a range of 50 to 160° C., more preferably, 70 to 140° C. The thermoplastic resin may be colored due to containing dyes or pigments.

The method for attaching a fine particle to a surface of the particle body (including the adhesive particle) is not especially limited, but examples thereof are a method in which the particle body and the fine particle are mixed in the aforementioned attachment ratio with mixing-apparatuses such as ball mills, automatic mortars, and mixers like as coffee mills, and a method in which such mixing is carried out by high-speed gas stream impact method. Among the above-mentioned mixing-apparatuses, the ball mill is preferable, because it enables uniform attachment.

Next, the second production process of the present invention is illustrated.

Each of the silane compounds of general formulae (1) and (2) and the silazanes, with which a surface of the raw particle is treated, is described specifically below.

The raw particle, as referred to herein, is a matter corresponding to a substantial portion of the spacer. The raw particle, for example, comprises the organic crosslinked polymer particle or the organic-inorganic-composite particle, and preferably comprises the organic-inorganic-composite particle for the same reason as aforementioned.

The fluoroalkyl group, which is an example of $R^1$ in general formula (1), is not especially limited, but examples of this fluoroalkyl group include fluoroalkyl groups as formed by displacing one or more hydrogen atoms of alkyl groups, such as methyl, ethyl, propyl, butyl, hexyl, octyl, nonyl, decyl, dodecyl, tridecyl, heptadecyl, hexadecyl, and octadecyl, with a fluorine atom.

The alkyl group with 6 to 20 carbon atoms, which is another example of $R^1$, is not especially limited, but examples of this alkyl group include hexyl, octyl, nonyl, decyl, dodecyl, tridecyl, heptadecyl, hexadecyl, and octadecyl.

The alkenyl group with 6 to 20 carbon atoms, which is another example of $R^1$, is not especially limited, but examples of this alkenyl group include hexenyl and octenyl.

The aryl group with 6 to 20 carbon atoms, which is another example of $R^1$, is not especially limited, but examples of this aryl group include phenyl, tolyl, benzyl, and phenethyl.

$R^1$ is preferably a fluoroalkyl group with 3 to 9 carbon atoms or an alkyl group with 6 to 9 carbon atoms, because if $R^1$ is such a group, the resultant spacer has a high electrification retention ratio at 5 minutes after corona electrification.

The alkyl group with 1 to 5 carbon atoms, which is an example of $R^2$ in general formula (1), is not especially limited, but examples of this alkyl group include methyl, ethyl, propyl, butyl, and pentyl.

The alkenyl group with 1 to 5 carbon atoms, which is another example of $R^2$, is not especially limited, but examples of this alkenyl group include vinyl and propenyl.

The aryl group with 6 to 20 carbon atoms, which is another example of $R^2$, is not especially limited, but examples of this aryl group include those which are specifically exemplified above as such an aryl group of an example of $R^1$. Particularly, methyl and ethyl are preferable as $R^2$, because if $R^2$ is such a group, the below-mentioned raw particle can easily be treated.

The X group in general formula (1) or (2) is not especially limited, but examples thereof include at least one type selected from the group consisting of alkoxy, acyloxy, hydroxyl, and halogen atoms. Particularly, at least one type selected from the group consisting of alkoxy groups with 1 to 5 carbon atoms and acyloxy groups with 2 to 5 carbon atoms is preferable, because if X is such a group, by-products of hydrolysis can easily be removed and do not give a bad influence to the fluidity or the electrification retention ratio.

Silane compound (1) is not especially limited if it has the above-mentioned groups. However, specific examples thereof are 3,3,3-trifluoropropylmethyldimethoxysilane, 3,3,3-trifluoropropylmethyldichlorosilane, (tridecafluoro-1,1,2,2-tetrahydrooctyl)methyldimethoxysilane, n-octylmethyldimethoxysilane, n-decylmethyldimethoxysilane, n-dodecylmethyldimethoxysilane. Particularly, 3,3,3-trifluoropropylmethyldimethoxysilane is preferable, because this compound enhances the fluidity or the electrification retention ratio.

The alkyl group, which is an example of $R^3$ to $R^5$ in general formula (2), is not especially limited, but examples of this alkyl group include the alkyl groups as mentioned specifically above as examples of $R^1$ or $R^2$.

The aryl group, which is another example of $R^3$ to $R^5$, is not especially limited, but examples of this aryl group include those which are specifically exemplified above as such an aryl group of an example of $R^1$.

The alkenyl group, which is another example of $R^3$ to $R^5$, is not especially limited, but examples of this alkenyl group include those which are specifically exemplified above as such an alkenyl group of an example of $R^1$ or $R^2$. $R^3$ to $R^5$ are preferably alkyl groups with 3 to 9 carbon atoms, alkenyl groups with 3 to 9 carbon atoms, aryl groups with 3 to 9 carbon atoms, and fluoroalkyl groups as formed by displacing at least one hydrogen atom of these alkyl, alkenyl, and aryl groups with a fluorine atom, because if $R^3$ to $R^5$ are such groups, the fluidity or the electrification retention ratio is enhanced.

Silane compound (2) is not especially limited if it has the above-mentioned groups. However, specific examples thereof are trimethylmethoxysilane, triethylethoxysilane, triphenylsilanol, tri-n-hexylchlorosilane, (3,3,3-trifluoropropyl)dimethylchlorosilane, (3,3,3-trifluoropropyl)dimethylmethoxysilane, (tridecafluoro-1,1,2,2-tetrahydrooctyl)dimethylmethoxysilane, p-tolyldimethylchlorosilane, tribenzylchlorosilane.

Silane compounds (1) and (2) are preferably silane compounds containing a fluorine atom, because if they are such compounds, the fluidity or electrification retention ratio of the resultant spacer is enhanced.

The silazane is not especially limited, but examples thereof are hexamethyldisilazane, 1,1,3,3,5,5-hexamethylcyclotrisilazane.

The method for treating a surface of the raw particle with the above-mentioned silicon compound may be a conventional one and therefore is not especially limited. However, examples thereof are the following methods (1) to (3).

(1) A method in which the raw particle is immersed in a treatment solution containing the silicon compound, and then dried (the filtration may be carried out before drying).

(2) A method in which a treatment solution containing the silicon compound is sprayed to or mixed with the raw particle, and then the particle is dried.

(3) A method in which the silicon compound is gasified, and the resultant gas is allowed to contact the raw particle.

The amount of the silicon compound as used is not especially limited, but this amount is preferably in a range of 0.1 to 100 wt %, more preferably, 0.2 to 50 wt %, still more preferably, 0.5 to 30 wt %, of the raw particle. Where the amount of the silicon compound is smaller than 0.1 wt %, the efficiency of the treatment with the silicon compound might be low and therefore the fluidity or the corona electrification retention ratio might be decreased. Where the amount of the silicon compound is larger than 100 wt %, a large amount of the silicon compound remains unreacted, so the fluidity might be low and therefore the dry dispersibility might be bad.

The drying temperature is preferably in a range of 40 to 250° C., more preferably, 60 to 200° C. The drying duration is preferably in a range of 10 minutes to 12 hours, more preferably, 30 minutes to 5 hours. Where the drying temperature or duration is outside these ranges, there is a possibility that the desired fluidity or electrification retention ratio could not be realized. In addition, the drying under reduced pressure or under vacuum is preferable, because such drying promotes the surface treatment.

The surface treatment of the raw particle of the spacer with the silicon compound is considered to provide a surface of the resultant spacer with the aforementioned groups, such as fluoroalkyl groups, alkyl groups, aryl groups, and alkenyl groups, which are originally included in the silicon compound. Thus, the surface treatment enhances the fluidity and the electrification retention ratio of the resultant spacer, and therefore provides excellent dry dispersibility and prevents the increase in the leakage of the light of a backlight lamp from a periphery of the spacer even if vibration or impact is given. In addition, because the silicon compound is a mono- or bifunctional organosilicon compound, the formation of a silanol group as derived from the silicon compound by the surface treatment occurs little, the electrification retention ratio is enhanced, and further the aggregation due to the silanol group as seen in treatment with alkyltrialkoxysilanes is difficult to occur. Therefore the resultant spacer has so large fluidity that the spacer is particularly favorable for the dry dispersion.

The raw particle is treated with the silicon compound in the above-mentioned way and then washed with solvents, such as water or alcohols, to remove a residual silicon compound or by-products such as hydrochloric add, alcohols, or carboxylic acids. Then, the product is separated by conventional methods, such as filtration or centrifugal separation, and then pulverized for monodispersion, thus obtaining a spacer for a liquid crystal display.

It is preferable that a surface of the raw particle is activated prior to the aforementioned treatment step with the silicon compound, because the activation of the surface promotes the subsequent surface treatment with the silicon compound. Methods for the activation are not especially limited, but examples thereof are a method in which the raw particle is brought into contact with an aqueous acid or alkaline solution of low concentration, and a method in which the raw particle is irradiated with rays such as ozone, electron rays, or X-rays. Particularly, where the raw particle is the organic-inorganic-composite particle, the method in which the raw particle is brought into contact with an aqueous acid or alkaline solution of low concentration is preferable, because such a method easily activates a surface of the raw particle and thereby makes it possible to efficiently carry out the subsequent surface treatment with the silicon compound. It is more preferable that the raw particle is a particle which contains silicon, because a silanol group (—SiOH) is allowed to form on a surface of such a raw particle, and because the subsequent surface treatment step therefore can be carried out more efficiently.

Next, the liquid crystal display of the present invention is illustrated.

As to the liquid crystal display of the present invention, its structure is basically the same as those of conventional liquid crystal displays, but the above-mentioned spacers 1A and 1B of the present invention are interposed between electrode substrates 110 and 120 instead of conventional spacers, thus keeping the gap distance between the electrode substrates 110 and 120 constant. The electrode substrates 110 and 120 have the same or nearly the same gap distance therebetween as the particle diameter of the spacers 1A and 1B. In FIG. 4, the symbolic numbers 2, 3, 4, 5, 6, and 7 represent a lower-substrate material, an upper-substrate material, oriented membranes, electrodes, polarizing films, and a liquid crystal as packed in a gap as surrounded by a sealing material, respectively.

The spacers 1A and 1B, which are provided to the liquid crystal display of the present invention, have particularly excellent dry dispersibility and can be dispersed uniformly onto the entirety of the substrates 2 and 3 without unevenness in the dry manner, so the liquid crystal display of the present invention has high contrast, little unevenness of the gap distance, and high image quality. Thus, the liquid crystal display of the present invention is effective as liquid crystal displays of large-sized panels, preferably, of 12 inches or more, further preferably, of 13 inches or more.

In the liquid crystal display of the present invention, members other than the spacers 1A and 1B, for example, the electrode substrates 110 and 120, the sealing material 8 and the liquid crystal 7, can be the same as such members of conventional liquid crystal displays and be employed in the same way as of such members of the conventional liquid crystal displays. The substrates 110 and 120 are prepared by forming electrodes on surfaces of the substrate materials 2 and 3 such as glass plates or films. If necessary, the oriented layers 4 may further be formed so as to cover the electrodes 5. The liquid crystal 7 can be conventional ones, for example, the following types: biphenyl, phenylcydohexane, Schiff bases, azo, azoxy, benzoic acid esters, terphenyl, cyclohexylcarboxylic acid esters, biphenyl-cyclohexane, pyrimidine, dioxane, cyclohexylcyclohexane esters, cyclohexylethane, cyclohexene, and fluorine. Examples of the sealing material 8 are epoxy resin adhesive sealing materials and UV-curable sealing materials.

An example of processes for producing the liquid crystal display of the present invention is a process comprising the following sequent steps of: dispersing uniformly a spacer of the present invention as an in-plane spacer 1A onto an electrode substrate 2 of two electrode substrates 2 and 3 in a dry manner; mounting the other electrode substrate 3 thereon; thermally curing or UV-curing an adhesive sealing material 8, as provided to a place where a sealing part spacer 1B is arranged, under a suitable increased pressure by heating the resultant composite at a temperature of 100–180° C. for 1–60 minutes or by irradiating the composite with ultraviolet rays of 40–300 mJ/cm$^2$; injecting a liquid crystal 7 into a gap between the substrates 2 and 3; and sealing a part through which the liquid crystal 7 was injected, thus obtaining a liquid crystal display.

BRIEF DESCRIPTION OF THE DRAWINGS

FIG. 2 is a diagram illustrating motions of the apparatus for measuring corona electrification properties.

BEST MODE FOR CARRYING OUT THE INVENTION

Hereinafter, the present invention is more specifically illustrated by the following examples of some preferred embodiments in comparison with comparative examples not according to the invention. However, the present invention is not limited to the below-mentioned examples.

[EXAMPLE A1]

A monomer mixture of 80% by weight of divinylbenzene and 20% by weight of dipentaerythritol hexaacrylate was subjected to suspension polymerization. The resultant polymer particle was separated from the resultant slurry by decantation, and then washed with water, and then classified in particle diameter, thus obtaining particle body (A1) having a mean particle diameter of 6.0 $\mu$m and a coefficient of variation of 5.3% in particle diameter. The fluidity (as measured by the method as disclosed in the DISCLOSURE OF THE INVENTION portion hereof) of this particle body (A1) was 10%.

Next, 100 g of particle body (A1), as obtained above, and 5 g of a hydrophobic fine particle of SiO$_2$ (Aerosil R972, made by Nippon Aerosil Co., Ltd., having a mean particle diameter of about 16 nm) as a fine particle were mixed together using a ball mill to attach the fine particle to a surface of particle body (A1), thus obtaining spacer (A1). The fluidity of this spacer (A1) was 60%.

Next, the dry dispersibility of spacer (A1), as obtained above, was evaluated by the following method:

Spacer (A1) was dispersed onto an electrode substrate of 300 mm×345 mm in a dry dispersion manner utilizing a high-speed gas stream manner, and then twenty-five observation divisions of an area were chosen from on the substrate and observed. As a result, there was only one observation division where a lump of two aggregated spacers was present, and there was no lump of three or more aggregated spacers.

Figure 1:
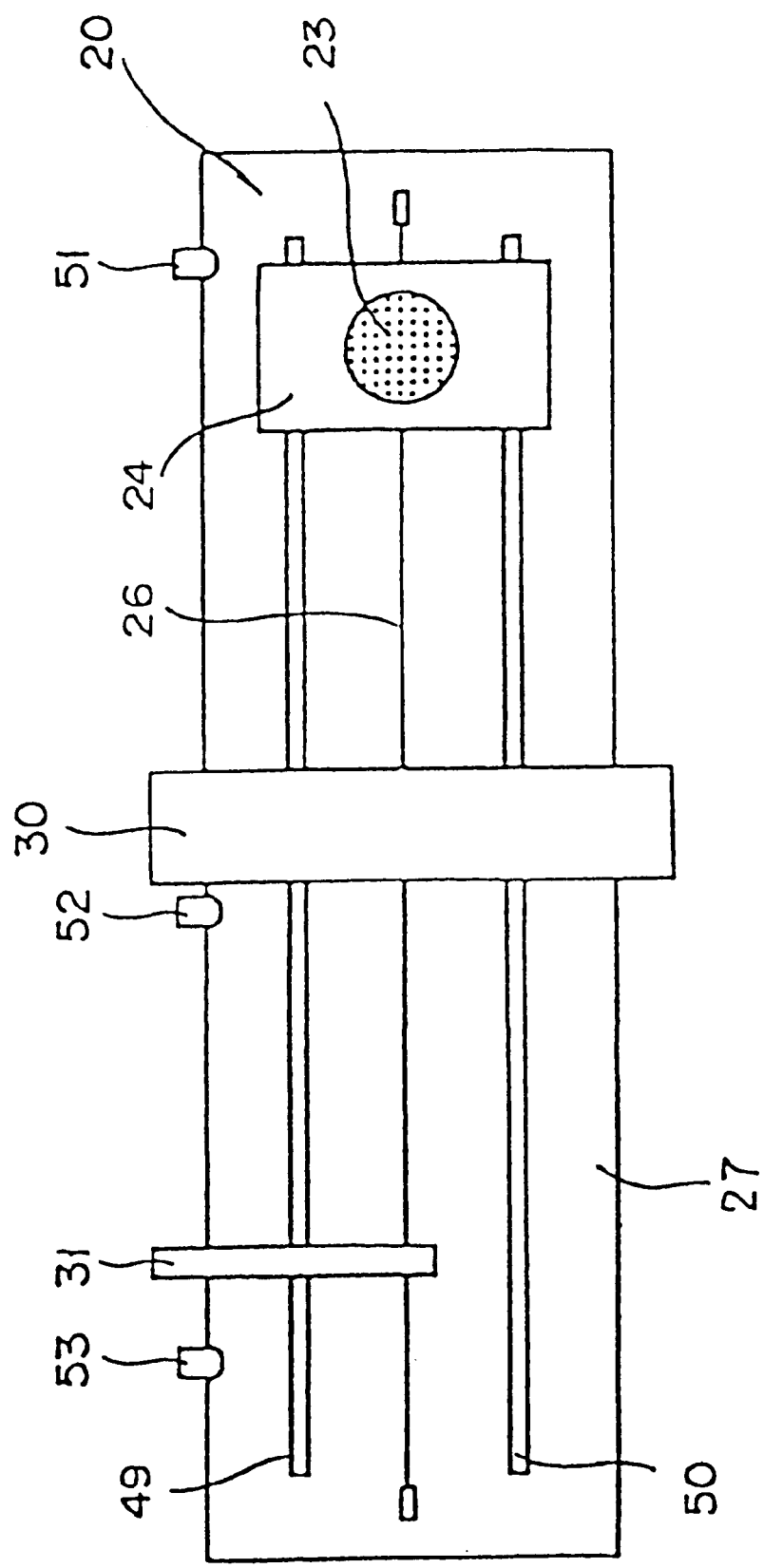
FIG. 1 is a planar partial diagram representing a conveyance mechanism of an apparatus for measuring corona electrification properties.
Figure 3:
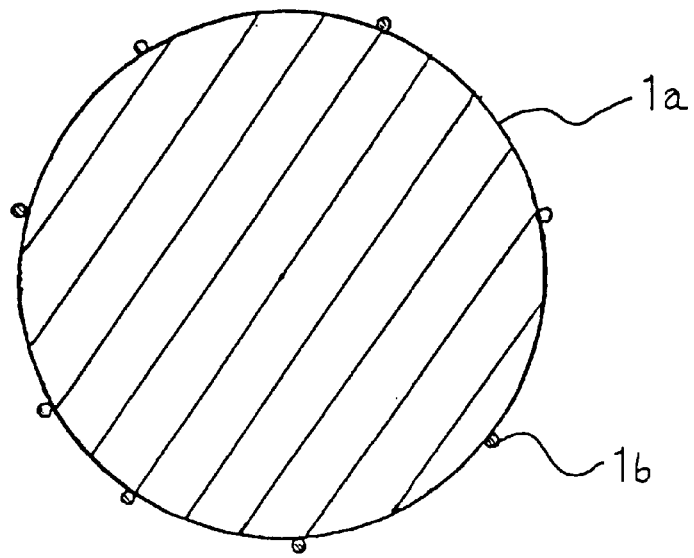
FIG. 3 is a sectional diagram representing an embodiment of a spacer of the present invention.
Figure 4:
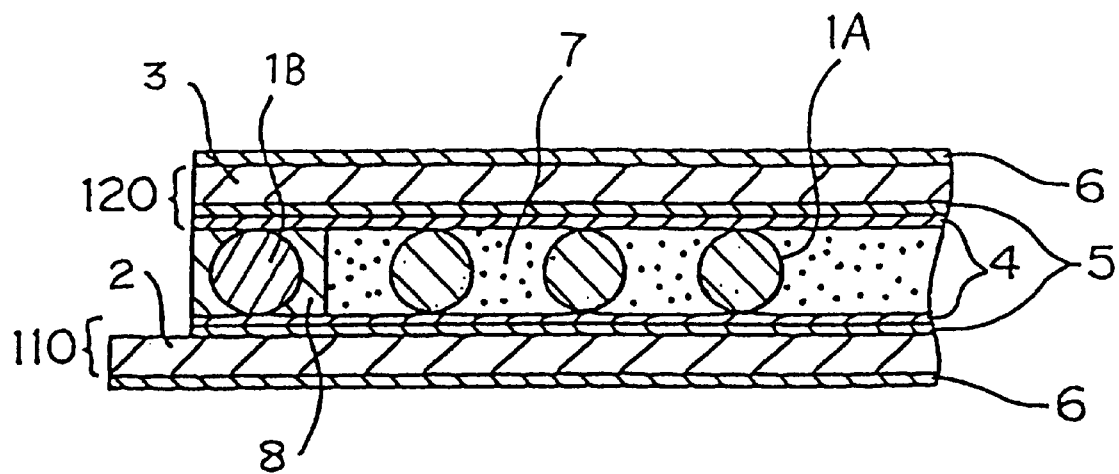
FIG. 4 is a fragmentary sectional diagram representing an embodiment of a liquid crystal display of the present invention.

Next, a liquid crystal display was made using spacer (A1) by the following process:

As shown in FIG. 4, a lower electrode substrate 110 was first obtained by laminately forming an electrode (for example, a transparent electrode) 5 and an oriented polyimide membrane 4 in sequence on a lower glass substrate 2 of 300 mm×345 mm×1.1 mm and then carrying out rubbing. Then, spacer (A1) was dispersed as an in-plane spacer 1A onto the lower electrode substrate 110 in a dry manner utilizing a high-speed gas stream manner.

On the other hand, an upper electrode substrate 120 was obtained by also laminately forming an electrode (for example a transparent electrode) 5 and an oriented polyimide membrane 4 in sequence on an upper glass substrate 3 of 300 mm×345 mm×1.1 mm, and then carrying out the rubbing. Then, a dispersion of spacer (A1) as a sealing part spacer 1B of 30 v/v % in an epoxy resin adhesive sealing material 8 was screen-printed onto a part, which would be an adhesive sealing part, of the upper electrode substrate 120.

Then, the upper and lower electrode substrates 120 and 110 were piled one upon the other through the in-plane spacer 1A so that the electrodes 5 and the oriented membranes 4 could be arranged opposite to each other respectively, and then the resultant composite was heated at 150° C. under an increased pressure of 1 kg/cm² for 30 minutes, thus curing thermally the adhesive sealing material 8.

Then, the gap between the two electrode substrates 120 and 110 was once put under vacuum and then returned to atmospheric pressure, thus injecting an STN liquid crystal 7, and a part through which the liquid crystal was injected was then sealed. Then, PVA (poly(vinyl alcohol)) polarizing films 6 were stuck to respective outer parts of the upper and lower glass substrates 2 and 3, thus obtaining liquid crystal display (A1).

As to liquid crystal display (A1) as produced above, the gap distance was uniform over the planar entirety, the area where no image was formed was small, abnormal orientation of the liquid crystal occurred little, and the image display quality was uniform.

[COMPARATIVE EXAMPLE A1]

Particle body (A1) itself, as obtained in Example A1, was used as the spacer, and the dry dispersibility thereof was evaluated in the same way as of Example A1. As a result, there were no less than ten observation divisions containing a lump as formed from aggregation of four or more particle bodies (A1).

In addition, a liquid crystal display was produced using particle body (A1) in the same way as of Example A1. As to the resultant liquid crystal display, however, the gap distance was not uniform, great unevenness occurred in image, and the image display quality was bad.

[EXAMPLE A2]

Dodecylbenzenesulfonic acid as a catalyst was added to a melamine-formaldehyde initial-condensation product, and the resultant mixture was heated to further condense the initial-condensation product, which was thereby cured. The resultant particle was separated from the resultant slurry by decantation, and then washed with water, and then classified in particle diameter, thus obtaining particle body (A2) having a mean particle diameter of 3.8 μm and a coefficient of variation of 4.3% in particle diameter. The fluidity of this particle body (A2) was 7%.

Next, 100 g of particle body (A2), as obtained above, and 2 g of a high-purity superfine particle of $Al_2O_3$ (Aluminum Oxide C, made by Nippon Aerosil Co., Ltd., having a mean particle diameter of about 13 nm) as a fine particle were mixed together using a ball mill to attach the fine particle to a surface of particle body (A2), thus obtaining spacer (A2). The fluidity of this spacer (A2) was 37%.

Next, the dry dispersibility of spacer (A2), as obtained above, was evaluated in the same way as of Example A1. As a result, there were two observation divisions where a lump of two aggregated spacers was present, and there was one observation division where a lump of three aggregated spacers was present, but there was no lump of four or more aggregated spacers.

In addition, a liquid crystal display was produced using spacer (A2) in the same way as of Example A1. As to the resultant liquid crystal display, the gap distance was uniform, the area where no image was formed was small, abnormal orientation of the liquid crystal occurred little, and the image display quality was uniform.

[COMPARATIVE EXAMPLE A2]

The dry dispersibility of particle body (A2), as obtained in Example A2, was evaluated in the same way as of Example A1. As a result, there were no less than twelve observation divisions containing a lump as formed from aggregation of four or more particle bodies (A2).

In addition, a liquid crystal display was produced using particle body (A2) in the same way as of Example A1. As to the resultant liquid crystal display, however, the gap distance was not uniform, great unevenness occurred in image, and the image display quality was bad.

[EXAMPLE A3]

A monomer mixture of 85% by weight of m-divinylbenzene (purity: 92%) and 15% by weight of acrylonitrile was subjected to suspension polymerization. The resultant polymer particle was separated from the resultant slurry by decantation, and then washed with water, and then classified in particle diameter, thus obtaining particle body (A3) having a mean particle diameter of 7.8 μm and a coefficient of variation of 3.0% in particle diameter. The fluidity of this particle body (A3) was 9%.

Next, 100 g of particle body (A3), as obtained above, and 4 g of a high-purity superfine particle of $TiO_2$ (titanium dioxide, made by Nippon Aerosil Co., Ltd., having a mean particle diameter of about 21 nm) as a fine particle were mixed together using a ball mill to attach the fine particle to a surface of particle body (A3), thus obtaining spacer (A3). The fluidity of this spacer (A3) was 40%.

Next, the dry dispersibility of spacer (A3), as obtained above, was evaluated in the same way as of Example A1. As a result, there were only two observation divisions where a lump of two aggregated spacers was present, and there is no lump of three or more aggregated spacers.

In addition, a liquid crystal display was produced using spacer (A3) in the same way as of Example A1. As to the resultant liquid crystal display, the gap distance was uniform, the area where no image was formed was small, abnormal orientation of the liquid crystal occurred little, and the image display quality was uniform.

[COMPARATIVE EXAMPLE A3]

Particle body (A3) itself, as obtained in Example A3, was used as the spacer, and the dry dispersibility thereof was evaluated in the same way as of Example A1. As a result, there were no less than eight observation divisions containing a lump as formed from aggregation of four or more particle bodies (A3).

In addition, a liquid crystal display was produced using particle body (A3) in the same way as of Example A1. As to the resultant liquid crystal display, however, the gap distance was not uniform, great unevenness occurred in image, and the image display quality was bad.

[EXAMPLE A4]

A monomer mixture of 50% by weight of styrene, 15% by weight of methyl methacrylate, and 35% by weight of γ-methacryloxypropyltrimethoxysilane was subjected to dispersion polymerization. The resultant polymer particle was separated from the resultant slurry by decantation, and then washed with water, and then classified in particle diameter, and then dried at 200° C. under reduced pressure, thus obtaining particle body (A4) having a mean particle diameter of 5.5 μm and a coefficient of variation of 4.7% in particle diameter. The fluidity of this particle body (A4) was 10%.

Next, 100 g of particle body (A4), as obtained above, and 3 g of a hydrophobic fine particle of $SiO_2$ (Aerosil R972, made by Nippon Aerosil Co., Ltd., having a mean particle diameter of about 16 nm) as a fine particle were mixed together using a ball mill to attach the fine particle to a surface of particle body (A4), thus obtaining spacer (A4) for a liquid crystal display. The fluidity of this spacer (A4) was 71%.

Next, the dry dispersibility of spacer (A4), as obtained above, was evaluated in the same way as of Example A1. As a result, there was no observation division where a lump of aggregated spacers was present.

In addition, a liquid crystal display was produced using spacer (A4) in the same way as of Example A1. As to the resultant liquid crystal display, the gap distance was uniform, the area where no image was formed was small, abnormal orientation of the liquid crystal occurred little, and the image display quality was uniform.

[COMPARATIVE EXAMPLE A4]

Particle body (A4) itself, as obtained in Example A4, was used as the spacer, and the dry dispersibility thereof was evaluated in the same way as of Example A1. As a result, there were no less than nine observation divisions containing a lump as formed from aggregation of four or more particle bodies (A4).

In addition, a liquid crystal display was produced using particle body (A4) in the same way as of Example A1. As to the resultant liquid crystal display, however, the gap distance was not uniform, great unevenness occurred in image, and the image display quality was bad.

<EXAMPLE B1>

Composite particle (1) was obtained by carrying out a co-hydrolysis-polycondensation reaction of alkoxysilyl groups and a radical polymerization reaction of double bonds with γ-methacryloxypropyltrimethoxysilane and vinyltrimethoxysilane (weight ratio: 55/45).

Composite particle (1), as obtained above, had a mean particle diameter of 6.0 μm, a coefficient of variation of 3.2% in particle diameter, and a polysiloxane framework content of 50.5 wt % in terms of $SiO_2$ (as sintered at 1,000° C. under air atmosphere) relative to the weight of composite particle (1).

Composite particle (1) was activated by dispersing 5 g of composite particle (1) into a mixed solvent of 20 g of 0.1% aqueous ammonia and 25 g of methanol and leaving the resultant mixture stationary for one night. Subsequently, the solvent was sufficiently removed by filtering the mixture under reduced pressure with a filter. The residue on the filter was dispersed into 45 g of toluene, and 1.0 g of 3,3,3-trifluoropropylmethyldimethoxysilane as the treating agent was added to the resultant dispersion. The resultant mixture was heated under stirred conditions to distil toluene off, thus obtaining a powder. This powder was dried under vacuum at 200° C. and then washed with toluene and methanol in sequence, and then dried under vacuum at 100° C., thus obtaining surface-treated particle (B1).

Surface-treated particle (B1) was examined with regard to the mean particle diameter, the coefficient of variation in particle diameter, the electrification retention ratio ($E_c$) as of 5 minutes after corona electrification, the fluidity, and the dry dispersibility. Results thereof are shown in Table 1. However, in the present example and the below-mentioned comparative examples, the manner for the dry dispersion was changed from the high-speed gas stream manner to an electrostatic dispersion manner.

Next, an STN type liquid crystal display (B1) of 13 inches in display size was produced using surface-treated particle (B1) as the spacer in the same way as of Example A1. However, the manner for the dry dispersion was changed from the high-speed gas stream manner to an electrostatic dispersion manner. As is shown in Table 1, as to liquid crystal display (B1), the gap distance was uniform, and the image display quality was good.

Next, liquid crystal display (B1) was annealed at 120° C. Then, after subjected to a 1,000-time-string test, liquid crystal display (B1) was examined with regard to the gap distance, the degree of the increase in the leakage of the light of a backlight lamp, and the image display quality. Results thereof are shown in Table 1.

<EXAMPLES B2 TO B5>

Surface-treated particles (B2) to (B5) were obtained in the same way as of Example B1 except that the sort of the treating agent was changed to those shown in Table 1, respectively.

Surface-treated particles (B2) to (B5) were examined with regard to the mean particle diameter, the coefficient of variation in particle diameter, the electrification retention ratio ($E_c$) as of 5 minutes after corona electrification, the fluidity, and the dry dispersibility in the same way as of Example B1. Results thereof are shown in Table 1.

Next, liquid crystal displays (B2) to (B5) were produced using surface-treated particles (B2) to (B5) as the spacer in the same way as of Example B1. As is shown in Table 1, as to all of liquid crystal displays (B2) to (B5), the gap distance was uniform, and the image display quality was good.

Next, after subjected to a 1,000-time-striking test, liquid crystal displays (B2) to (B5) were examined with regard to the gap distance, the degree of the increase in the leakage of the light of a backlight lamp, and the image display quality. Results thereof are shown in Table 1.

<COMPARATIVE EXAMPLES B1 TO B6>

Comparative surface-treated particles (B11) to (B16) were obtained in the same way as of Example B1 except that the sort of the raw particle to subject to surface treatment with the treating agent and the sort of the treating agent were those which are shown in Table 2.

Comparative surface-treated particles (B11) to (B16) were examined with regard to the mean particle diameter, the coefficient of variation in particle diameter, the electrification retention ratio ($E_c$) as of 5 minutes after corona electrification, the fluidity, and the dry dispersibility in the same way as of Example B1. Results thereof are shown in Table 2.

Next, comparative liquid crystal displays (B11) to (B16) were produced using comparative surface-treated particles (B11) to (B16) as the spacer in the same way as of Example B1. Comparative liquid crystal displays (B11) to (B16) were examined with regard to the gap distance and the image display quality. Results thereof are shown in Table 2.

Next, after subjected to a 1,000-time-striking test, comparative liquid crystal displays (B11) to (B16) were examined with regard to the gap distance, the degree of the increase in the leakage of the light of a backlight lamp, and the image display quality. Results thereof are shown in Table 2.

<COMPARATIVE EXAMPLE B7>

Ten grams of a particle (mean particle diameter: 6.0 μm, coefficient of variation in particle diameter: 4.5%) of a crosslinked copolymer of divinylbenzene and tetramethylolmethane tetraacrylate (weight ratio of these co-monomers: 50/50) was dispersed into a solution as prepared by dissolving 0.3 g of 2-acetoxyethyltrichlorosilane into 50 g of toluene. The resultant dispersion was heated at 55° C. for 1 hour and then filtered, thus obtaining a particle. This particle was further heated at 120° C. for 1 hour and then dispersed into a solution as prepared by dissolving 0.1 g of tetrabutoxytitanium into 40 g of toluene. The resultant dispersion was heated at 55° C. for 1 hour and then filtered, thus obtaining a particle. This particle was further heated at 120° C. for 1 hour, thus obtaining comparative surface-treated particle (B17).

Comparative surface-treated particle (B17) was examined with regard to the mean particle diameter, the coefficient of variation in particle diameter, the electrification retention ratio ($E_c$) as of 5 minutes after corona electrification, the fluidity, and the dry dispersibility in the same way as of Example B1. Results thereof are shown in Table 2.

Next, comparative liquid crystal display (B17) was produced using comparative surface-treated particle (B17) as the spacer in the same way as of Example B1. Comparative liquid crystal display (B17) were examined with regard to the gap distance and the image display quality. Results thereof are shown in Table 2.

Next, after subjected to a 1,000-time-striking test, comparative liquid crystal display (B17) was examined with regard to the gap distance, the degree of the increase in the leakage of the light of a backlight lamp, and the image display quality. Results thereof are shown in Table 2.

TABLE 1

| | | | Properties of spacer | | | | | Properties of liquid crystal display | | | | |
| | | | | | | | | Before 1,000-time-striking tset | | After 1,000-time-striking test | | |
| Example No. | Raw particle | Treating agent | Mean particle diameter μm | Coefficient of variation in particle diameter (%) | Fluidity (%) | Dry dispersibility *1 | Electrification retention ratio $E_c$ (%) | Uniformity of gap distance | Image display quality | Uniformity of gap distance | Degree of increase in leakage of light of backlight lamp from periphery of spacer | Image display quality |
|---|---|---|---|---|---|---|---|---|---|---|---|---|
| B1 | Composite particle (1) | 3,3,3-Trifluoropropyl-methyl-dimethoxysilane | 6.0 | 3.5 | 64 | ○ (2) | 92 | ○ | ○ | ○ | ○ | ○ |
| B2 | Composite particle (1) | (Tridecafluoro-1,1,2,2-tetrahydrooctyl)-dimethylmethoxy-silane | 6.0 | 3.6 | 61 | ○ (3) | 98 | ○ | ○ | ○ | ○ | ○ |
| B3 | Composite particle (1) | n-Decylmethyl-dimethoxysilane | 6.0 | 3.5 | 71 | ○ (1) | 84 | ○ | ○ | ○ | Δ | ○ |
| B4 | Composite particle (1) | n-Octenyldimethyl-methoxysilane | 6.0 | 3.4 | 70 | ○ (1) | 83 | ○ | ○ | ○ | Δ | ○ |
| B5 | Composite particle (1) | Hexamethyl-disilazane | 6.0 | 3.2 | 75 | ○ (0) | 77 | ○ | ○ | ○ | Δ | ○ |

*1: The numerical value in the parentheses is the number of observation divisions where an aggregation lump is present.

TABLE 2

| Comparative Example No. | Raw particle | Treating agent | Properties of spacer — Mean particle diameter μm | Coefficient of variation in particle diameter (%) | Fluidity (%) | Dry dispersibility *1 | Electrification retention ratio $E_c$ (%) | Before 1,000-time-striking tset — Uniformity of gap distance | Image display quality | After 1,000-time-striking test — Uniformity of gap distance | Degree of increase in leakage of light of backlight lamp from periphery of spacer | Image display quality |
|---|---|---|---|---|---|---|---|---|---|---|---|---|
| B1 | Composite particle (1) | 3,3,3-Trifluoropropyl-trimethoxysilane | 6.0 | 3.6 | 27 | Δ (6) | 55 | Δ | Δ | Δ | Δ | Δ |
| B2 | Composite particle (1) | n-Decyltrimethoxy-silane | 6.0 | 3.7 | 24 | Δ (7) | 51 | Δ | Δ | Δ | Δ | Δ |
| B3 | Silica-based particle *2) | 3,3,3-Trifluoropropyl-trimethoxysilane | 6.0 | 2.8 | 18 | × (10) | 0 | Δ | × | × | × | × |
| B4 | Silica-based particle *2 | n-Decyltrimethoxy-silane | 6.0 | 2.9 | 19 | × (11) | 0 | Δ | × | × | × | × |
| B5 | Divinyl-benzene-based particle *3 | 3,3,3-Trifluoropropyl-trimethoxysilane | 6.0 | 4.8 | 15 | × (10) | 28 | Δ | Δ | × | × | × |
| B6 | Divinyl-benzene-based particle *3 | n-Octadecyl-trimethoxysilane | 6.0 | 4.9 | 14 | × (12) | 22 | Δ | Δ | × | × | × |
| B7 | Divinyl-benzene-based particle *3 | 2-Acetoxyethyl-trichlorosilane-tetrabutoxy-titanium | 6.0 | 5.2 | 25 | × (15) | 14 | × | × | × | × | × |

*1: The numerical value in the parentheses is the number of the observation divisions where an aggregation lump is present.
*2: Silica (mean particle diameter: 6.0 μm, coefficient of variation in particle diameter: 2.5%)
*3: Particle (mean particle diameter: 6.0 μm, coefficient of variation in particle diameter: 4.5%) of a crosslinked copolymer of divinylbenzene and tetramethylolmethane tetraacrylate tetraacrylate (weight ratio of these co-monomers: 50/50)

In the Tables above, the standards of the evaluation for the dry dispersibility of the spacers and for the properties of the liquid crystal displays before and after the striking test are as follows:

[Dry dispersibility]
○: good, Δ: normal, X: bad.
[Uniformity of gap distance]
○: no color unevenness, Δ: a little color unevenness, X: much color unevenness.
[Degree of increase, due to striking test, in leakage of light of backlight lamp from periphery of spacer]
o: almost no change, Δ: small, X: large.
[Image display quality before and after striking test]
o: good, Δ: normal, X: bad.

INDUSTRIAL APPLICATION

The spacer of the present invention is used for the production of a liquid crystal display and is useful because this spacer is difficult to aggregate even when dispersed onto a substrate in a dry manner.

The present invention process for producing a spacer can easily provide the spacer as mentioned immediately above.

Because of the use of the spacer as mentioned immediately above, the liquid crystal display of the present invention can keep the thickness of a liquid crystal layer uniform and constant. Thus, this liquid crystal display involves image unevenness or image display deficiency little and therefore has excellent image display quality. The liquid crystal display of the present invention can be employed for the same purposes as of conventional ones, for example, can be employed as image display elements for televisions, personal computers, word processors, car navigation systems, and PHS (personal handy-phone systems), and is particularly useful for monitors, televisions, and personal computers, as provided with large-sized panels.

We claim:
1. A liquid crystal display comprising:
a) two electrode substrates, which are arranged opposite to each other;
b) a plurality of spacers, which are interposed between the electrode substrates, thereby confronting each of the electrode substrates and maintaining a gap distance between the electrode substrates, wherein each of the spacers comprises a particle which has a mean particle diameter of 0.5 to 25 μm, a coefficient of variation of 10% or less in particle diameter, and a fluidity of 30% or more, wherein the fluidity is measured and defined by sieving a powder of the particle by a method comprising the following steps of:
i) placing three different types of JIS-Z8801-standard sieves on top of each other, wherein each of the three sieves comprises a brass frame and bronze mesh and wherein the three sieves have an inner diameter of 75 mm, a depth of 20 mm, and a mesh size of 150 μm (100 mesh), 75 μm (200 mesh), and 45 μm (330 mesh), respectively, and wherein the 150 μm (100 mesh) sieve is on top, the 45 μm (330 mesh) sieve is on bottom, and the 75 μm (200 mesh) sieve is in between the other two sieves;

ii) spreading 2.0 g of the powder on the entire surface of the mesh of the top sieve so uniformly that a surface of the powder may get as even as possible;

iii) vibrating the three sieves up and down at an amplitude of 1 mm and a frequency of 60 Hz for 120 seconds; and iv) defining the ratio by weight (%) of a portion, which passes through the bottom sieve, of the powder to the initial weight of the powder (2.0 g), namely, the mesh-passing ratio, as the fluidity;

c) and wherein the particle further comprises a particle body and a plurality of hydrophobic inorganic fine particles which are attached to the particle body; and d) a liquid crystal, which is packed between the electrode substrates.

2. A liquid crystal display according to claim 1, wherein the particle body comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

3. A liquid crystal display according to claim 2, wherein the plurality of fine particles comprise hydrophobic silica having a mean particle diameter of 0.03 μm or less.

4. A liquid crystal display according to claim 1, wherein the plurality of fine particles comprise hydrophobic silica having a mean particle diameter of 0.03 μm or less.

5. A liquid crystal display according to claim 1, wherein a particle is obtained by a process comprising the step of treating a surface of a raw particle with at least one silicon compound selected from the group consisting of:

silane compounds (1) of the following general formula (1):

$$R^1R^2SiX_2 \quad (1)$$

wherein:

$R^1$ is at least one monovalent group selected from the group consisting of: fluoroalkyl groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;

$R^2$ is at least one monovalent group selected from the group consisting of: alkyl groups with 1 to 5 carbon atoms; alkenyl groups with 1 to 5 carbon atoms; and aryl groups with 6 to 20 carbon atoms; and X is a monovalent hydrolyzable group wherein the two X groups may be identical with or different from each other;

silane compounds (2) of the following general formula (2):

$$R^3R^4R^5SiX \quad (2)$$

wherein:

each of $R^3$ to $R^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and X is a monovalent hydrolyzable group which may be identical with or different from those in general formula (1) above; and silazanes.

6. A liquid crystal display according to claim 5, wherein the particle further has an electrification retention ratio of 40% or more at 5 minutes after corona electrification.

7. A liquid crystal display according to claim 6, wherein the raw particle comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

8. A liquid crystal display according to claim 5, wherein the raw particle comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

9. A process for producing a liquid crystal display, comprising the steps of:

a) providing two electrode substrates and arranging the electrode substrates opposite to each other;

b) providing a plurality of spacers and interposing the spacers between the electrode substrates, thereby confronting each of the electrode substrates and maintaining a gap distance between the electrode substrates, wherein each of the spacers comprises a particle having a mean particle diameter of 0.5 to 25 μm and a coefficient of variation of 10% or less in particle diameter, wherein the particle comprises a particle body and a plurality of hydrophobic inorganic fine particles which are attached to the particle body;

c) attaching the plurality of hydrophobic inorganic fine particles to a surface of the particle body, thus providing the particle with a fluidity of 30% or more wherein the fluidity is measured and defined by sieving a powder of the particle by a method comprising the following steps of:

i) placing three different type of JIS-Z8801-standard sieves on top of each other, wherein each of the three sieves comprises a brass frame and bronze mesh and wherein the three sieves have an inner diameter of 75 mm, a depth of 20 mm, and a mesh size of 150 μm (100 mesh), 75 μm (200 mesh), and 45 μm (330 mesh), respectively, and wherein the 150 μm (100 mesh) sieve is on top, the 45 μm (330 mesh) sieve is on bottom, and the 75 μm (200 mesh) sieve is in between the other two sieves;

ii) spreading 2.0 g of the powder on the entire surface of the mesh of the top sieve so uniformly that a surface of the powder may get as even as possible;

iii) vibrating the three sieves up and down at an amplitude of 1 mm and a frequency of 60 Hz for 120 seconds; and iv) defining the ratio by weight (%) of a portion, which passes through the bottom sieve, of the powder to the initial weight of the powder (2.0 g), namely, the mesh-passing ratio, as the fluidity; and d) providing a liquid crystal and packing the liquid crystal between the electrode substrates.

10. A process according to claim 9, wherein the particle body comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

11. A process according to claim 10, wherein the plurality of fine particles comprise hydrophobic silica having a mean particle diameter of 0.03 $\mu$m or less.

12. A process according to claim 9, wherein the plurality of fine particles comprise hydrophobic silica having a mean particle diameter of 0.03 $\mu$m or less.

13. A process for producing a liquid crystal display, comprising the steps of:
   a) providing two electrode substrates and arranging the electrode substrates opposite to each other;
   b) providing a plurality of spacers and interposing the spacers between the electrode substrates, thereby confronting each of the electrode substrates and maintaining a gap distance between the electrode substrates, wherein each of the spacers comprises a particle having a mean particle diameter of 0.5 to 25 $\mu$m and a coefficient of variation of 10% or less in particle diameter, wherein the particle is obtained by treating a surface of a raw particle with a silicon compound;
   c) treating a surface of the raw particle with at least one silicon compound selected from the group consisting of:
   silane compounds (1) of the following general formula (1):

$$R^1R^2SiX_2 \quad (1)$$

wherein:
   $R^1$ is at least one monovalent group selected from the group consisting of: fluoroalkyl groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;
   $R^2$ is at least one monovalent group selected from the group consisting of: alkyl groups with 1 to 5 carbon atoms; alkenyl groups with 1 to 5 carbon atoms; and aryl groups with 6 to 20 carbon atoms; and
   X is at least one monovalent hydrolyzable group selected from the group consisting of alkoxy groups with 1 to 5 carbon atoms and acyloxy groups with 2 to 5 carbon atoms, therein the two X groups may be identical with or different from each other;
   silane compounds (2) of the following general formula (2):

$$R^3R^4R^5SiX \quad (2)$$

wherein:
   each of $R^3$ to $R^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and
   X is at least one monovalent hydrolyzable group selected from the group consisting of alkoxy groups with 1 to 5 carbon atoms and acyloxy groups with 2 to 5 carbon atoms, and may be identical with or different from the X groups in general formula (1) above; and silazanes;
   d) thus providing the spacer particle with a fluidity of 30% or more wherein the fluidity is measured and defined by sieving a powder of the particle by a method comprising the following steps of:
      i) placing three different types of JIS-Z8801-standard sieves on top of each other, wherein each of the three sieves comprises a brass frame and bronze mesh and wherein the three sieves have an inner diameter of 75 mm, a depth of 20 mm, and a mesh size of 150 $\mu$m (100 mesh), 75 $\mu$m (200 mesh), and 45 $\mu$m (330 mesh), respectively, and wherein the 150 $\mu$m (100 mesh) sieve is on top, the 45 $\mu$m (330 mesh) sieve is on bottom, and the 75 $\mu$m (200 mesh) sieve is in between the other two sieves;
      ii) spreading 2.0 g of the powder on the entire surface of the mesh of the top sieve so uniformly that a surface of the powder may get as even as possible;
      iii) vibrating the three sieves up and down at an amplitude of 1 mm and a frequency of 60 Hz for 120 seconds; and
      iv) defining the ratio by weight (%) of a portion, which passes through the bottom sieve, of the powder to the initial weight of the powder (2.0 g), namely, the mesh-passing ratio, as the fluidity; and
   e) providing a liquid crystal and packing the liquid crystal between the electrode substrates.

14. A process according to claim 13, wherein the raw particle comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

15. A liquid crystal display, comprising:
   a) two electrode substrates, which are arranged opposite to each other;
   b) a plurality of spacers, which are interposed between the electrode substrates, thereby confronting each of the electrode substrates and maintaining a gap distance between the electrode substrates; and
   c) a liquid crystal, which is packed between the electrode substrates;
   d) wherein the plurality of spacers comprise a particle which has a mean particle diameter of 0.5 to 25 $\mu$m, a coefficient of variation of 10% or less in particle diameter, and a fluidity of 30% or more;
   e) wherein the particle comprises a particle body and a plurality of hydrophobic inorganic fine particles which are attached to the particle body;
   f) with the liquid crystal display being obtained by a process comprising the step of dispersing the plurality of spacers onto the electrode substrate in a dry manner utilizing either one or both of a high speed gas stream manner and an electrostatic dispersion manner; and
   g) wherein the fluidity is measured and defined by sieving a powder of the particle by a method comprising the following steps of:
      placing three different types of JIS-Z8801-standard sieves on top of each other, wherein each of the three sieves comprises a brass frame and bronze mesh and wherein the three sieves have an inner diameter of 75 mm, a depth of 20 mm, and a mesh size of 150 μm (100 mesh), 75 μm (200 mesh), and 45 μm (330 mesh), respectively, and wherein the 150 μm (100 mesh) sieve is on top, the 45 μm (330 mesh) sieve is on bottom, and the 75 μm (200 mesh) sieve is in between the other two sieves;

spreading 2.0 g of the powder on the entire surface of the mesh of the top sieve so uniformly that a surface of the powder may get as even as possible;

vibrating the three sieves up and down at an amplitude of 1 mm and a frequency of 60 Hz for 120 seconds; and defining the ratio by weight (%) of a portion, which passes through the bottom sieve, of the powder to the initial weight of the powder (2.0 g), namely, the mesh-passing ratio, as the fluidity.

16. A liquid crystal display according to claim 15, wherein the particle comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

17. A liquid crystal display according to claim 16, wherein the plurality of fine particles comprise hydrophobic silica having a mean particle diameter of 0.03 μm or less.

18. A liquid crystal display according to claim 16, which is provided with the plurality of spacers and has a display size of 12 inches or more.

19. A liquid crystal display according to claim 16, which is provided with the plurality of spacers and has a display size of 13 inches or more.

20. A liquid crystal display according to claim 15, wherein the plurality of fine particles comprise hydrophobic silica having a mean particle diameter of 0.03 μm or less.

21. A liquid crystal display according to claim 20, which is provided with the plurality of spacers and has a display size of 12 inches or more.

22. A liquid crystal display according to claim 20, which is provided with the plurality of spacers and has a display size of 13 inches or more.

23. A liquid crystal display according to claim 15, wherein the particle is obtained by a process comprising the step of treating a surface of a raw particle with at least one silicon compound selected from the group consisting of:

silane compounds (1) of the following general formula (1):

$$R^1R^2SiX_2 \qquad (1)$$

wherein:

R$^1$ is at least one monovalent group selected from the group consisting of fluoroalkyl groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;

R$^2$ is at least one monovalent group selected from the group consisting of: alkyl groups with 1 to 5 carbon atoms; alkenyl groups with 1 to 5 carbon atoms; and aryl groups with 6 to 20 carbon atoms; and X is a monovalent hydrolyzable group wherein the two X groups may be identical with or different from each other;

silane compounds (2) of the following general formula (2):

$$R^3R^4R^5SiX \qquad (2)$$

wherein:

each of R$^3$ to R$^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and X is a monovalent hydrolyzable group which may be identical with or different from those in general formula (1) above; and silazanes.

24. A liquid crystal display according to claim 23, wherein the particle further has an electrification retention ratio of 40% or more at 5 minutes after corona electrification.

25. A liquid crystal display according to claim 24, which is provided with the plurality of spacers and has a display size of 12 inches or more.

26. A liquid crystal display according to claim 24, which is provided with the plurality of spacers and has a display size of 13 inches or more.

27. A liquid crystal display according to claim 23, wherein the raw particle comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in a range of 10 to 90 wt % relative to the composite particle.

28. A liquid crystal display according to claim 27, which is provided with the plurality of spacers and has a display size of 12 inches or more.

29. A liquid crystal display according to claim 27, which is provided with the plurality of spacers and has a display size of 13 inches or more.

30. A liquid crystal display according to claim 23, which is provided with the plurality of spacers and has a display size of 12 inches or more.

31. A liquid crystal display according to claim 23, which is provided with the plurality of spacers and has a display size of 13 inches or more.

32. A liquid crystal display according to claim 15, which is provided with the plurality of spacers and has a display size of 12 inches or more.

33. A liquid crystal display according to claim 32, which is provided with the plurality of spacers and has a display size of 13 inches or more.

34. A liquid crystal display according to claim 15, which is provided with the plurality of spacers and has a display size of 13 inches or more.

35. A liquid crystal display, comprising:

a) two electrode substrates, which are arranged opposite to each other;

b) a plurality of spacers, which are interposed between the electrode substrates, thereby confronting each of the electrode substrates and maintaining a gap distance between the electrode substrates, wherein each of the spacers comprises a particle which has a mean particle diameter of 0.5 to 25 μm, a coefficient of variation of 10% or less in particle diameter, and a fluidity of 30% or more, wherein the particle comprises a particle body and a plurality of fine particles which are attached to the particle body, wherein the particle body comprises an organic-inorganic-composite particle having organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$, which constitutes the polysiloxane framework is in the range of 10 to 90 wt % relative to the composite particle;

c) wherein the fluidity is measured and defined by sieving a powder of the particle by a method comprising the following steps of:

i) placing three different types of JIS-Z8801-standard sieves on top of each other, wherein each of the three sieves comprises a brass frame and bronze mesh and wherein the three sieves have an inner diameter of 75 mm, a depth of 20 mm, and a mesh size of 150 µm (100 mesh), 75 µm (200 mesh), and 45 µm (330 mesh), respectively, and wherein the 150 µm (100 mesh) sieve is on top, the 45 µm (330 mesh) sieve is on bottom, and the 75 µm (200 mesh) sieve is in between the other two sieves;

ii) spreading 2.0 g of the powder on the entire surface of the mesh of the top sieve so uniformly that a surface of the powder may get as even as possible;

iii) vibrating the three sieves up and down at an amplitude of 1 mm and a frequency of 60 Hz for 120 seconds; and iv) defining the ratio by weight (%) of a portion, which passes through the bottom sieve, of the powder to the initial weight of the powder (2.0 g), namely, the mesh-passing ratio, as the fluidity; and d) a liquid crystal, which is packed between the electrode substrates.

36. A liquid crystal display, comprising:

a) two electrode substrates, which are arranged opposite to each other;

b) a plurality of spacers, which are interposed between the electrode substrates, thereby confronting each of the electrode substrates and maintaining a gap distance between the electrode substrates, wherein each of the spacers comprises a particle which has a fluidity of 30% or more, and is obtained by a process comprising the step of treating a surface of a raw particle with at least one silicon compound selected from the group consisting of:

silane compounds (1) of the following general formula (I):

$$R^1R^2SiX_2 \qquad (1)$$

wherein:

$R^1$ is at least one monovalent group selected from the group consisting of: fluoroalkyl or groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;

$R^2$ is at least one monovalent group selected from the group consisting of: alkyl groups with 1 to 5 carbon atoms; alkenyl groups with 1 to 5 carbon atoms; and aryl groups with 6 to 20 carbon atoms; and X is at least one monovalent hydrolyzable group selected from the group consisting of alkoxy groups with 1 to 5 carbon atoms and acyloxy groups with 2 to 5 carbon atoms, wherein the two X groups may be identical with or different from each other;

silane compounds (2) of the following general formula (2):

$$R^3R^4R^5SiX \qquad (2)$$

wherein:

each of $R^3$ to $R^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and X is at least one monovalent hydrolyzable group selected from the group consisting of alkoxy groups with 1 to 5 carbon atoms and acyloxy groups with 2 to 5 carbon atoms, and may be identical with or different from the X groups in general formula (1) above; and silazanes;

c) wherein the fluidity is measured and defined by sieving a powder of the particle by a method comprising the following steps of:

i) placing three different types of JIS-Z8801-standard sieves on top of each other, wherein each of the three sieve comprises a brass frame and bronze mesh and wherein the three sieves have an inner diameter of 75 mm, a depth of 20 mm, and a mesh size of 150 µm (100 mesh), 75 µm (200 mesh), and 45 µm (330 mesh), respectively, and wherein the 150 µm (100 mesh) sieve is on top, the 45 µm (330 mesh) sieve is on bottom, and the 75 µm (200 mesh) sieve is in between the other two sieves;

ii) spreading 2.0 g of the powder on the entire surface of the mesh of the top sieve so uniformly that a surface of the powder may get as even as possible;

iii) vibrating the three sieves up and down at an amplitude of 1 mm and a frequency of 60 Hz for 120 seconds; and iv) defining the ratio by weight (%) of a portion, which passes through the bottom sieve, of the powder to the initial weight of the powder (2.0 g), namely, the mesh-passing ratio, as the fluidity; and d) a liquid crystal, which is packed between the electrode substrates.

37. A process for producing a liquid crystal display, comprising the steps of:

a) providing two electrode substrates and arranging the electrode substrates opposite to each other;

b) providing a plurality of spacers and interposing the spacers between the electrode substrates, thereby confronting the electrode substrates and maintaining a gap distance between the electrode substrates, wherein each of the spacers comprises a particle having a mean particle diameter of 0.5 to 25 µm and a coefficient of variation of 10% or less in particle diameter, wherein the particle comprises a particle body and a plurality of fine particles which are attached to the particle body, wherein the particle body comprises an organic-inorganic-composite particle having an organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$ which constitutes the polysiloxane framework is in the range of 10 to 90 wt % relative to the composite particle;

c) attaching the plurality of fine particles to a surface of the particle body, thus providing the particle with a fluidity of 30% or more, wherein the fluidity is measured and defined by sieving a powder of the particle by a method comprising the following steps of:
  i) placing three different types of JIS-Z8801-standard sieves on top of each other, wherein each of the three sieves comprises a brass frame and bronze mesh and wherein the three sieves have an inner diameter of 75 mm, a depth of 20 mm, and a mesh size of 150 $\mu$m (100 mesh), 75 $\mu$m (200 mesh), and 45 $\mu$m (330 mesh), respectively, and wherein the 150 $\mu$m (100 mesh) sieve is on top, the 45 $\mu$m (330 mesh) sieve is on bottom, and the 75 $\mu$m (200 mesh) sieve is in between the other two sieves;
  ii) spreading 2.0 g of the powder on the entire surface of the mesh of the top sieve so uniformly that a surface of the powder may get as even as possible;
  iii) vibrating the three sieves up and down at an amplitude of 1 mm and a frequency of 60 Hz for 120 seconds; and
  iv) defining the ratio by weight (%) of a portion, which passes through the bottom sieve, of the powder to the initial weight of the powder (2.0 g), namely, the mesh-passing ratio, as the fluidity; and
d) providing a liquid crystal and packing the liquid crystal between the electrode substrates.

38. A liquid crystal display, comprising:
a) two electrode substrates, which are arranged opposite to each other;
b) a plurality of spacers, which are interposed between the electrode substrates, thereby confronting each of the electrode substrates and maintaining a gap distance between the electrode substrates;
c) a liquid crystal, which is packed between the electrode substrates;
d) wherein the plurality of spacers comprise particles, with the particles having a mean particle diameter of 0.5 to 25 $\mu$m, a coefficient of variation of 10% or less in particle diameter; and
e) wherein each of the particles comprises a particle body and a plurality of hydrophobic inorganic fine particles which are attached to said particle body.

39. A liquid crystal display, comprising:
a) two electrode substrates, which are arranged opposite to each other;
b) a plurality of spacers, which are interposed between the electrode substrates, thereby confronting each of the electrode substrates and maintaining a gap distance between the electrode substrates;
c) a liquid crystal, which is packed between the electrode substrates;
d) wherein the plurality of spacers comprise particles, with the particles having a mean particle diameter of 0.5 to 25 $\mu$m and a coefficient of variation of 10% or less in particle diameter;
e) wherein the particle comprises a particle body and a plurality of fine particles which are attached to said particle body; and
f) wherein the particle body further comprises an organic-inorganic-composite particle having organic polymer framework and a polysiloxane framework, wherein the polysiloxane framework has in its molecule an organosilicon containing a silicon atom as directly and chemically bonded to at least one carbon atom of the organic polymer framework, and wherein the quantity of $SiO_2$, which constitutes the polysiloxane framework is in the range of 10 to 90 wt % relative to the composite particle.

40. A liquid crystal display, comprising:
a) two electrode substrates, which are arranged opposite to each other;
b) a plurality of spacers, which are interposed between the electrode substrates, thereby confronting each of the electrode substrates and maintaining a gap distance between the electrode substrates;
c) a liquid crystal, which is packed between the electrode substrates; and
d) wherein each of the spacers comprises a particle, with each of the particles being obtained by a process comprising the step of treating a surface of a raw particle with at least one silicon compound selected from the group consisting of:
silane compounds (1) of the following general formula (1):

$$R^1R^2SiX_2 \tag{1}$$

wherein:
  $R^1$ is at least one monovalent group selected from the group consisting of: fluoroalkyl groups as formed by displacing at least one hydrogen atom of alkyl groups with a fluorine atom; alkyl groups with 6 to 20 carbon atoms; alkenyl groups with 6 to 20 carbon atoms; and aryl groups with 6 to 20 carbon atoms;
  $R^2$ is at least one monovalent group selected from the group consisting of: alkyl groups with 1 to 5 carbon atoms; alkenyl groups with 1 to 5 carbon atoms; and aryl groups with 6 to 20 carbon atoms; and
  X is at least one monovalent hydrolyzable group selected from the group consisting of alkoxy groups with 1 to 5 carbon atoms and acyloxy groups with 2 to 5 carbon atoms, wherein the two X groups may be identical with or different from each other;
silane compounds (2) of the following general formula (2):

$$R^3R^4R^5SiX \tag{2}$$

wherein:
  each of $R^3$ to $R^5$ is at least one monovalent group selected from the group consisting of: alkyl groups; alkenyl groups; aryl groups; and fluoroalkyl groups as formed by displacing at least one hydrogen atom of the alkyl groups, the alkenyl groups, and the aryl groups with a fluorine atom; and
  X is at least one monovalent hydrolyzable group selected from the group consisting of alkoxy groups with 1 to 5 carbon atoms and acyloxy groups with 2 to 5 carbon atoms, and may be identical with or different from the X groups in general formula (1) above; and silazanes.

* * * * *